(12) United States Patent
Shipley, Jr.

(10) Patent No.: US 11,199,134 B2
(45) Date of Patent: Dec. 14, 2021

(54) LOBED GAS DISCHARGE FAIRING FOR A TURBOFAN ENGINE

(71) Applicant: United Technologies Corporation, Farmington, CT (US)

(72) Inventor: Edward Nicholas Shipley, Jr., Vernon, CT (US)

(73) Assignee: Ford Global Technologies, LLC, Dearborn, MI (US)

(*) Notice: Subject to any disclaimer, the term of this patent is extended or adjusted under 35 U.S.C. 154(b) by 349 days.

(21) Appl. No.: 15/674,824

(22) Filed: Aug. 11, 2017

(65) Prior Publication Data
US 2019/0048731 A1 Feb. 14, 2019

(51) Int. Cl.
*F02K 3/077* (2006.01)
*F02C 7/18* (2006.01)
*F02C 7/14* (2006.01)

(52) U.S. Cl.
CPC .............. *F02C 7/185* (2013.01); *F02K 3/077* (2013.01); *F02C 7/14* (2013.01); *F05D 2260/213* (2013.01)

(58) Field of Classification Search
CPC ..... F02K 1/48; F02K 3/02; F02K 1/52; F02K 3/077
See application file for complete search history.

(56) References Cited

U.S. PATENT DOCUMENTS

| 5,269,135 A | 12/1993 | Vermejan et al. |
| 6,058,696 A | 5/2000 | Nikkanen et al. |
| 6,106,229 A | 8/2000 | Nikkanen et al. |
| 7,762,057 B2* | 7/2010 | Sloan .................. F02K 1/386 60/226.1 |
| 8,516,791 B2* | 8/2013 | Perveiler ............. F02C 7/14 60/226.1 |
| 8,726,665 B2* | 5/2014 | Moore ................. F02K 1/386 60/725 |
| 9,551,239 B2* | 1/2017 | Byrne .................. F01D 25/30 |
| 9,574,518 B2* | 2/2017 | Moore ................. F02K 1/383 |

(Continued)

FOREIGN PATENT DOCUMENTS

| EP | 0924407 | 6/1999 |
| EP | 2020500 | 2/2009 |

OTHER PUBLICATIONS

Konrad Kozaczuk, "Engine nacelles design—Problems and challenges", May 8, 2017, Sage, Proceedings of the Institution of Mechanical Engineers, Part G: Journal of Aerospace Engineering, 2017, vol. 231 (12) 2259-2265. (Year: 2017).*

(Continued)

*Primary Examiner* — Todd E Manahan
*Assistant Examiner* — Alyson Joan Harrington
(74) *Attorney, Agent, or Firm* — Carlson, Gaskey & Olds, P.C.

(57) ABSTRACT

A gas turbine engine has an engine core including a primary flowpath. A first bypass duct is positioned radially outward of the engine core. A gas discharge protrudes radially into the first bypass duct. The gas discharge includes a fairing defining a lobed outlet. The lobed outlet includes a plurality of axially aligned peaks and axially aligned valleys. Each of the axially aligned valleys is configured to prevent a fluid passing through the valley from traveling radially inward immediately downstream of the fairing creating regions of relatively cool, mixed, and hot airflows.

16 Claims, 5 Drawing Sheets

(56) References Cited

U.S. PATENT DOCUMENTS

| | | | | |
|---|---|---|---|---|
| 9,995,245 B2* | 6/2018 | Dindar | .................... | F02K 1/48 |
| 2010/0043386 A1* | 2/2010 | Perveiler | .................. | F02C 7/14 |
| | | | | 60/39.5 |
| 2011/0167785 A1* | 7/2011 | Moore | .................... | F02K 1/386 |
| | | | | 60/204 |
| 2015/0107225 A1* | 4/2015 | Dindar | .................... | F02K 1/48 |
| | | | | 60/262 |
| 2015/0152789 A1* | 6/2015 | Thomas | .................... | F02C 7/32 |
| | | | | 415/144 |
| 2015/0167549 A1 | 6/2015 | Ribarov et al. | | |
| 2015/0345395 A1* | 12/2015 | Moore | .................... | F02K 1/383 |
| | | | | 60/806 |
| 2016/0177828 A1* | 6/2016 | Snyder | .................... | F02K 3/075 |
| | | | | 415/144 |
| 2016/0208692 A1* | 7/2016 | Hanlon | .................... | F02K 3/075 |
| 2016/0298550 A1* | 10/2016 | Kupratis | .................... | F02C 3/13 |
| 2016/0312662 A1* | 10/2016 | Byrne | .................... | F01D 25/30 |

OTHER PUBLICATIONS

European Search Report for Application No. 18188087.3 dated Nov. 7, 2018.
Khurana, Dr. K. C., Aviation Management: Global Perspectives, Global India Publications Pvt Ltd, New Delhi 2009, p. 43.

* cited by examiner

LOBED GAS DISCHARGE FAIRING FOR A TURBOFAN ENGINE

STATEMENT REGARDING FEDERALLY SPONSORED RESEARCH OR DEVELOPMENT

This invention was made with government support under contract number FA8626-16-C-2139 awarded by the United States Air Force. The government has certain rights in the invention.

TECHNICAL FIELD

The present disclosure relates generally to gas turbine engines, and more specifically to a gas turbine engine including a lobed gas discharge outlet protruding into a duct.

BACKGROUND

A gas turbine engine typically includes a fan section and a core engine section with the core engine section including a compressor section, a combustor section and a turbine section. Air entering the compressor section is compressed and delivered into the combustor section where it is mixed with fuel and ignited to generate an exhaust gas flow. The exhaust gas flow expands through the turbine section to drive the compressor and the fan section. In some examples, the exhaust gas flow is also accelerated through an exhaust nozzle to generate thrust.

The fan section drives air through a first bypass passage defined about the core engine. High bypass turbine engines include large bypass passages as compared to airflow through the core engine section and are suited for fuel efficient operation. Engines for applications in high speed aircraft include smaller bypass passages and generate more thrust from the core engine section. Fuel efficiency is increased by utilizing the bypass passage to generate thrust. Greater thrust is generated with more flow through the core engine section as relative to the bypass passage. Fuel efficiency is therefore balanced against aircraft thrust requirements and therefore, smaller bypass passages are utilized to provide higher thrust requirements that sacrifice some fuel efficiency.

A variable cycle gas turbine engine can switch between highly fuel efficient operation with an increased amount of bypass airflow and high speed operation with less bypass airflow and more thrust produced from the core engine section through the exhaust nozzle.

Although variable cycle gas turbine engines have improved operational efficiency, turbine engine manufacturers continue to seek further improvements to engine performance including improvements to thermal, transfer and propulsive efficiencies.

SUMMARY

In one exemplary embodiment a gas turbine engine includes an engine core including a primary flowpath, a first bypass duct positioned radially outward of the core engine, a gas discharge protruding radially into the first bypass duct, the gas discharge including a fairing defining a lobed outlet, and wherein the lobed outlet includes a plurality of axially aligned peaks and axially aligned valleys, each of the axially aligned valleys being configured to prevent a fluid passing through the valley from traveling radially inward immediately downstream of the fairing.

Another example of the above described gas turbine engine further includes a second bypass duct disposed between the first bypass duct and the engine core.

In another example of any of the above described gas turbine engines the gas discharge is connected to a heat exchanger outlet.

In another example of any of the above described gas turbine engines the first bypass duct is defined by an outer diameter wall and an inner diameter wall, and wherein the outer diameter wall is comprised of a first material having a first maximum temperature and the inner diameter wall is comprised of a second material having a second maximum temperature.

In another example of any of the above described gas turbine engines the second maximum temperature is greater than the first maximum temperature.

In another example of any of the above described gas turbine engines the outer diameter wall further comprises one of the second material and a third material downstream of the first material, the third material having a higher maximum temperature than the first material.

In another example of any of the above described gas turbine engines the third material has a higher maximum temperature than an expected discharge temperature of the lobed outlet.

In another example of any of the above described gas turbine engines the lobed outlet is configured to define a cool air region, a mixed air region and a hot air region within the first bypass duct.

In another example of any of the above described gas turbine engines the hot air region extends along the inner diameter of the first bypass duct.

In another example of any of the above described gas turbine engines the hot air region extends only a partial radial height of the first bypass duct.

In another example of any of the above described gas turbine engines the hot air region extends a full radial height of the first bypass duct at a portion of the first bypass duct including an outer wall comprised of a third material.

In another example of any of the above described gas turbine engines the portion of the outer wall comprised of the third material is a nozzle.

In another example of any of the above described gas turbine engines each of the axially aligned valleys defines an axial flowpath immediately downstream of an aft edge of the lobed outlet.

In another example of any of the above described gas turbine engines each of the axially aligned valleys defines a radially outwardly directed flowpath immediately downstream of an aft edge of the lobed outlet.

In another example of any of the above described gas turbine engines each of the axially aligned peaks defines a radially inwardly directed flowpath immediately downstream of an aft edge of the lobed outlet.

In another example of any of the above described gas turbine engines the plurality of axially aligned peaks and axially aligned valleys includes at least a first set of peaks having a first height and a second set of peaks having a second height, the first height being different from the second height.

In one exemplary embodiment a gas discharge outlet includes a heated fluid source including an exhaust outlet, a fairing connected to the exhaust outlet and configured to direct exhausted fluid into a duct, and at least one of the plurality of valleys and the plurality of peaks being configured to define a fluid flow such that the exhausted fluid flow is constrained to an inner diameter of the duct for at least a length of the duct.

In another example of the above described gas discharge outlet the fairing is aligned with an expected fluid flow direction and includes a plurality of peaks and a plurality of valleys having cross sections at least approximately normal to the expected fluid flow direction.

In another example of any of the above described gas discharge outlet the plurality of valleys are one axially aligned at a downstream edge of the fairing and angled radially outward at the downstream edge of the fairing.

In another example of any of the above described gas discharge outlet the plurality of peaks are one of axially aligned at a downstream edge of the fairing and angled radially inward at the downstream edge of the fairing.

These and other features disclosed herein can be best understood from the following specification and drawings, the following of which is a brief description.

DETAILED DESCRIPTION

Figure 1:
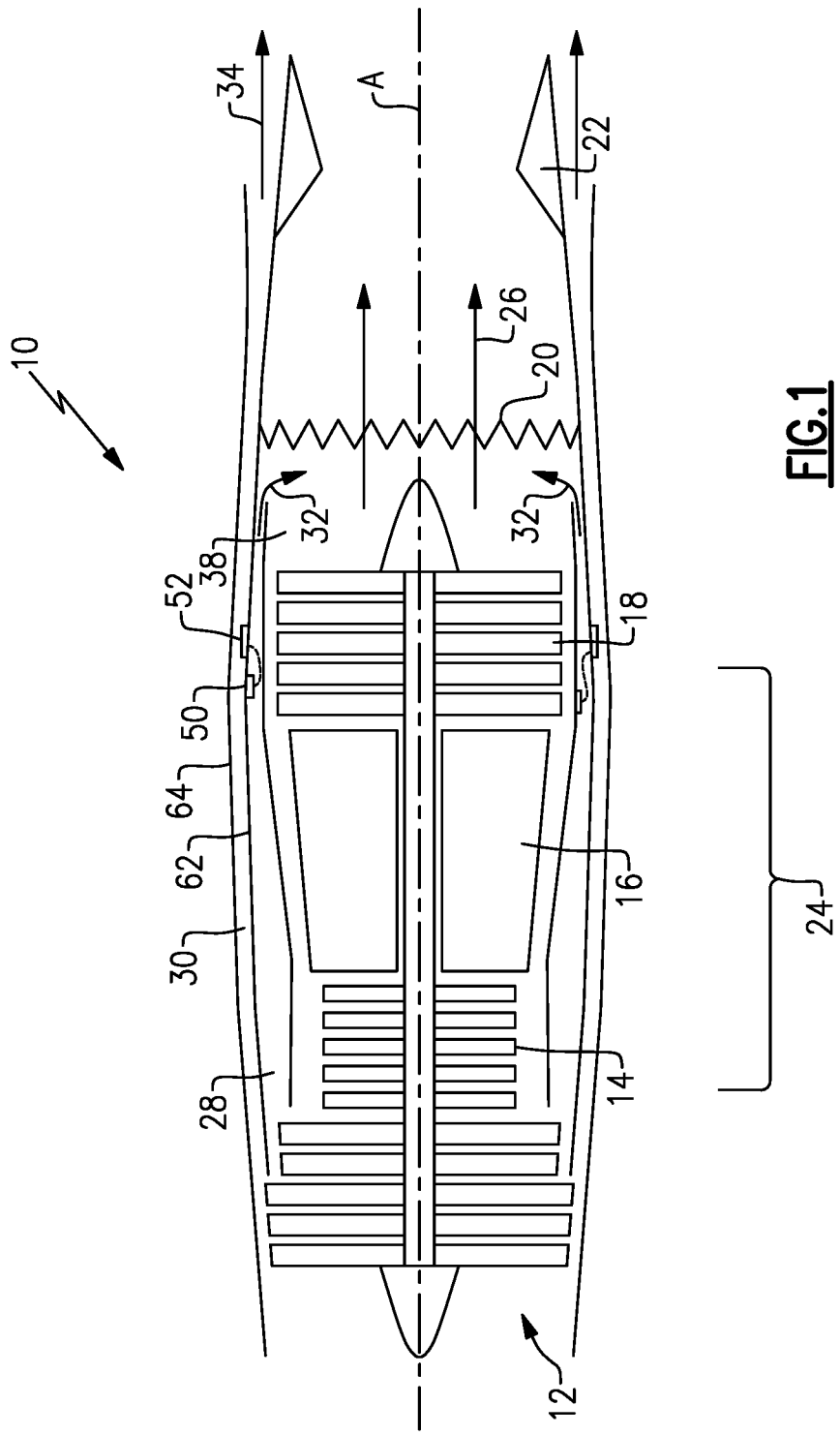
FIG. 1 is a schematic view of an example gas turbine engine.

FIG. 1 schematically illustrates a variable cycle gas turbine engine 10 that includes a fan 12 and a core engine 24. The core engine 24 includes a compressor 14 that compresses air and supplies that air to a combustor 16 where the compressed air is mixed with fuel and ignited to generate an exhaust gas flow that expands through a turbine section 18. The turbine section 18 in turn drives the compressor section 14 and the fan 12.

The example gas turbine engine 10 also includes an augmenter section 20 where additional fuel from a core flow path 38 can be mixed with exhaust gasses and ignited to generate additional thrust. The exhaust gas or core flow 26 flows through a nozzle 22 that includes a convergent/divergent portion to produce thrust.

The example engine 10 includes a first bypass passage 28 that is disposed annularly around the core engine 24 and a second bypass passage 30 that is disposed radially outward of the first bypass passage 28. A first bypass airflow 32 passing through the first bypass passage 28 and a second bypass airflow 34 passing through the second bypass passage 30 provide for an increased efficiency of thrust production by the engine 10. Bypass airflows 32, 34 passing through the bypass passages 28 and 30 improves fuel efficiency and are utilized in a fuel efficient or cruise mode of the gas turbine engine 10. Accordingly, airflow through the first and second bypass passages 28 and 30 can be utilized to increase overall engine efficiency and reduce fuel consumption at cruising speeds.

The example engine 10 includes a heat exchanger 50 as part of the engine cooling systems. While illustrated in the example engine 10 as being disposed on an outer diameter of the first bypass passage 28, the heat exchanger 50 could be disposed at any position within the example engine 10 and still operate as described herein. During the course of operations, the heat exchanger 50 ingests cold air which is then used to cool a cooling airflow. The ingested cold air is heated as a result of the cooling process, and the heat exchanger 50 exhausts spent (heated) air. The exhausted air is expelled into a duct, such as the second bypass passage 30, via a gas discharge 52 that is connected to the outlet. While illustrated herein as being the same axial position as the turbine section 18, it is understood that the gas discharge 52 can be positioned in alternate positions within a given bypass passage 28, 30, depending on the needs and configuration of the specific engine 10.

In some engines, such as the example engine 10 of FIG. 1, an inner diameter wall 62 and an outer diameter wall 64 of one or both of the bypass passages 28, 30 are constructed of distinct materials, with the material of the outer diameter wall 64 having a lower maximum temperature than the inner diameter wall 62. Further, in some configurations the spent air being expelled into the bypass passage 30 via the gas discharge 52 is hotter than the maximum temperature of the outer diameter wall 64 material. In alternative examples, the outer diameter wall 64 can include a downstream portion constructed of a third material having a higher maximum temperature than the discharged gas. By way of example, the downstream portion would be a nozzle section of the bypass duct 64.

Figure 2:
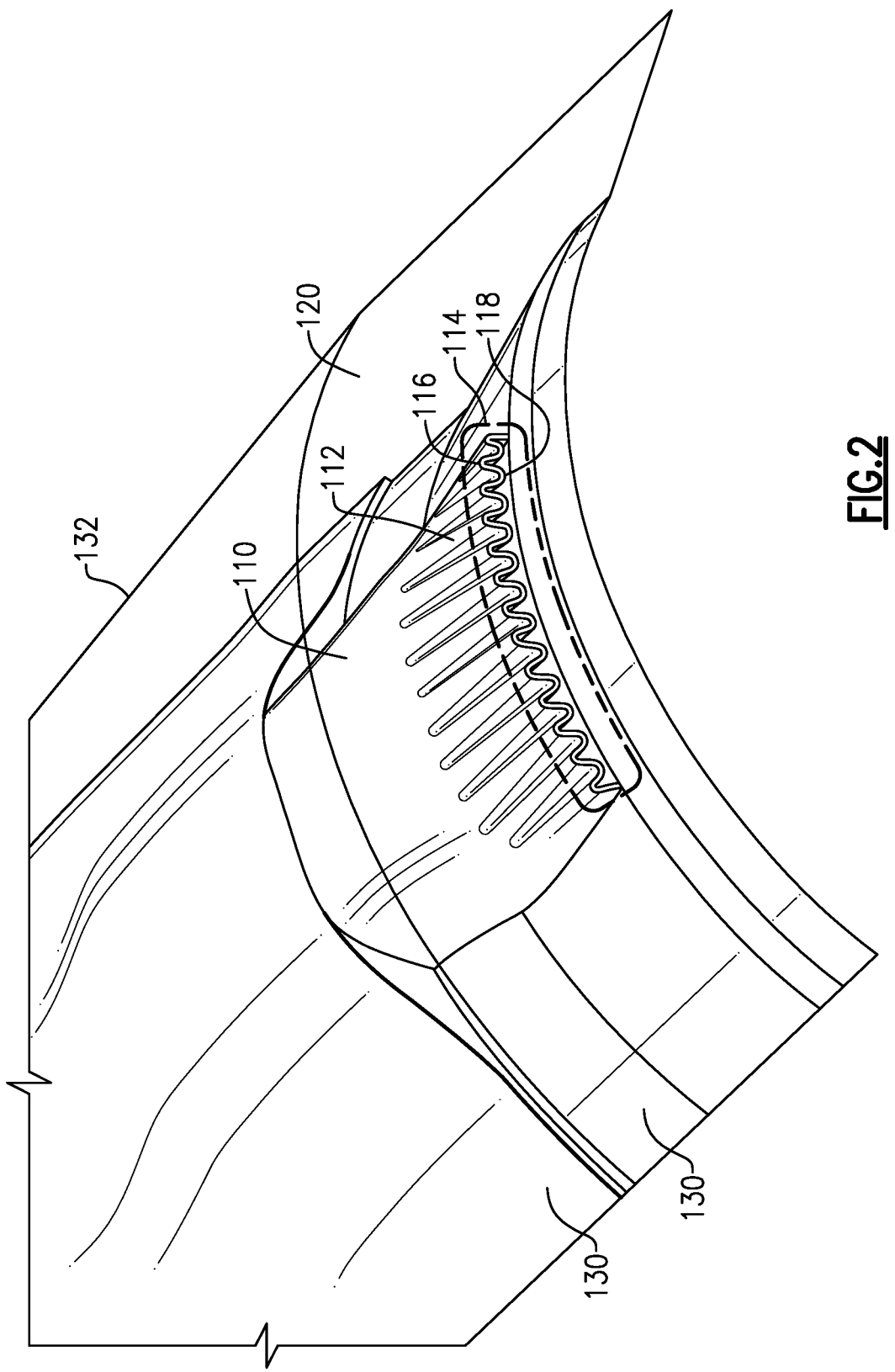
FIG. 2 is a schematic isometric view of an exhaust outlet fairing within a duct.

With continued reference to FIG. 1, FIG. 2 schematically illustrates an exemplary gas discharge outlet 110 within a duct 120, such as could be used as the gas discharge 52 of FIG. 1. The gas discharge outlet 110 protrudes radially outward into the duct 120 from an inner diameter wall 130, and includes a shaped fairing 112. The shaped fairing 112 defines a lobed outlet 114 including multiple peaks 116 and valleys 118.

The lobed outlet 114 directs the discharged gas, as well as gases already flowing through the duct 120, such that the discharged gas travels along the inner diameter wall 130, and does not spread to the outer diameter wall 132 until the discharged gas has traveled sufficiently downstream such that the discharged gas has cooled below the maximum temperature threshold of the outer diameter wall 132 material. In alternative examples, the lobed outlet 114 can be configured such that the discharged gas does not reach a radial position of the outer diameter wall 132 until after the discharged gas has exited the duct 120 entirely.

Figure 3:
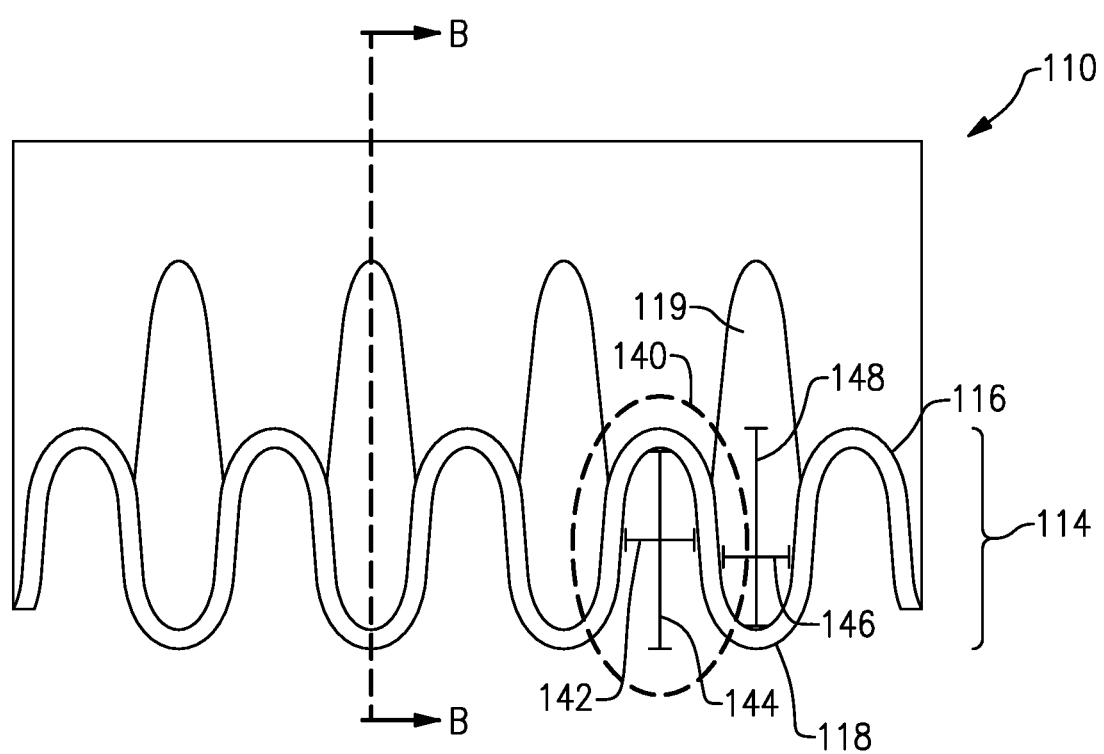
FIG. 3 is a forward view of the gas discharge outlet fairing of FIG. 2.

With continued reference to FIG. 2, FIG. 3 schematically illustrates a forward view of the gas discharge outlet 110 of FIG. 2. The lobed outlet 114 includes multiple peaks 116 and valleys 118. Each of the valleys 118 defines a downward sloping region 119 on the shaped fairing 112 that causes airflow within the duct 120 (see FIG. 2) to flow radially inward as the airflow through the duct approaches the lobed outlet 114. In contrast to the valleys 118, the peaks 116 are shaped such that the heated flow exiting the lobed outlet 114 maintains a generally constant radial extent from the inner diameter wall 130 of the duct 120. In some alternative examples, the peaks 116 can be further angled radially inward, directing the gas discharge toward the inner diameter wall 130 of the duct 120. In such examples, the hot discharge flowing out of the lobed outlet 114 is maintained at or near the inner diameter wall 130 for a longer distance away from the lobed outlet 114.

Similarly, in alternative examples, the angle of the shaped fairing 112 at the edge of the valleys 118 can be radially outward, relative to an axis defined by the engine, thereby directing the cool air back toward the outer diameter wall 132, rather than axially.

Each of the peaks 116 defines a lobe 140 having a width 142 and a height 144. The height 144 is aligned with a radius of the inner diameter wall 130 and defines the distance between the peak and the inner diameter wall 130. The width 142 is aligned with a circumference of the inner diameter wall 130. Also defining each lobe 140 are the adjacent valleys 118, each of which includes a width 146 and a height 148, with the width 146 and the height 148 of the adjacent valleys 118 being generally aligned with the width 142 and height 144 of the corresponding peak 116.

Figure 4:
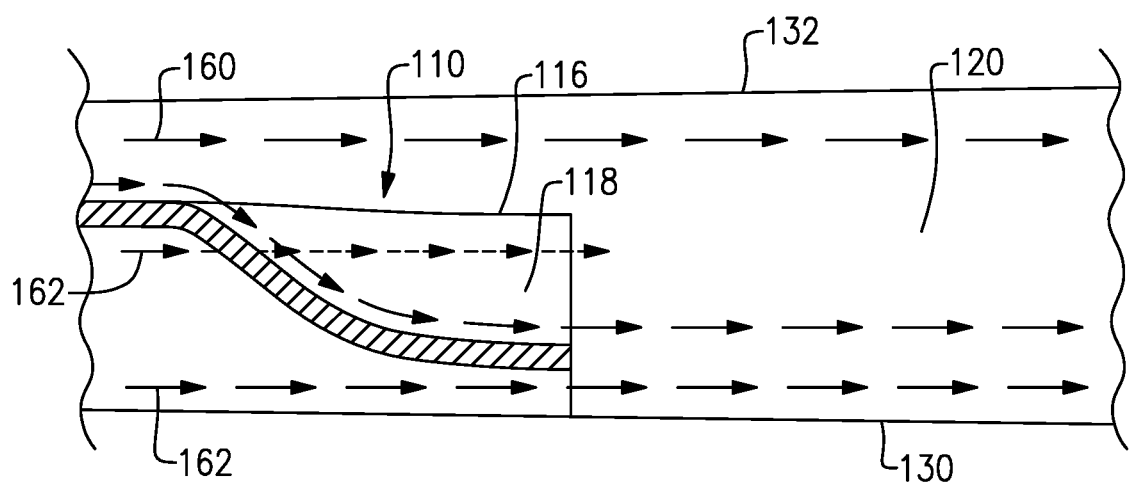
FIG. 4 is a cross sectional side view of the gas discharge outlet fairing of FIG. 3 drawn along a cross sectional line B-B.

With continued reference to FIG. 3, FIG. 4 schematically illustrates a cross sectional side view of the gas discharge outlet 110 of FIG. 3 drawn along a cross sectional line B-B. The gas discharge outlet 110 is disposed on an inner diameter wall 130 of the duct 120. A flowpath 160 illustrates a flow of relatively cool air through the duct 120. As the cool air approaches and enters the valley 118, the flowpath 160 travels radially inward. As the downstream edge of the valley 118 is at approximately zero degrees, relative to the inner diameter wall 130, the cool air traveling along the flowpath 160 through the duct 120 passes the downstream edge of the gas discharge outlet 110 in a generally axial direction.

A second flowpath 162 defines the fluid flow through the gas discharge outlet 110. As the downstream edge of peak 116 is aligned with the inner diameter wall 130, the discharged heated exhaust is not oriented radially outward and the hot flow 162 remains along the inner diameter wall 130. In yet further exemplary embodiments, the downstream edge of the lobed discharge outlet can be angled radially inward, driving the heated discharge toward the inner diameter wall 130.

Figure 5:
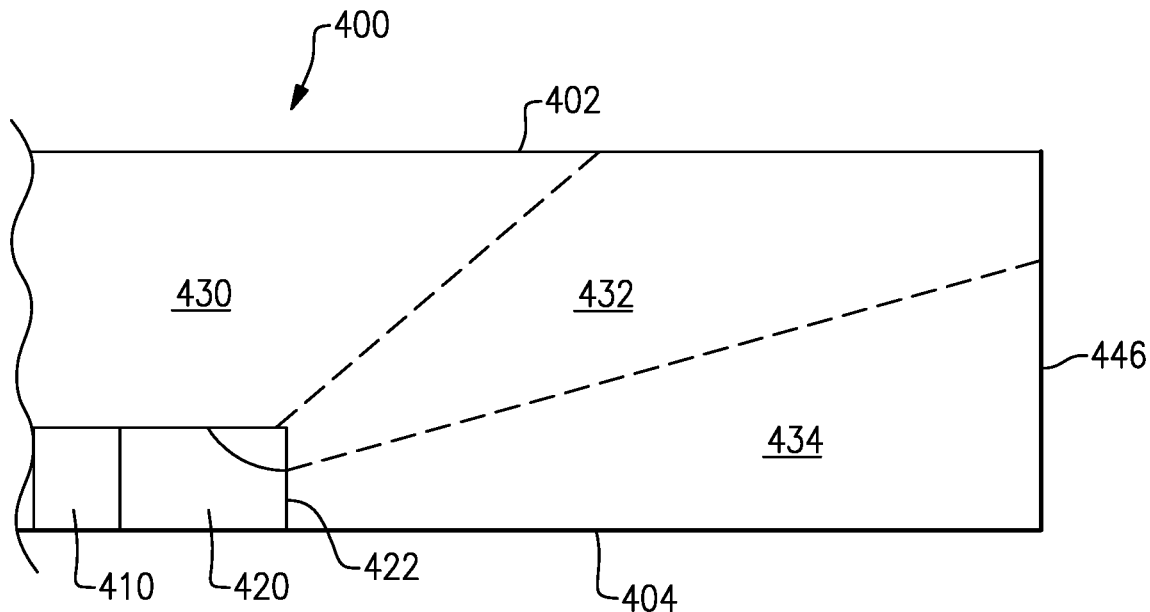
FIG. 5 is a schematic side view of a duct including a gas discharge having a lobed fairing.

With continued reference to FIGS. 3 and 4, FIG. 5 is a schematic side view of a duct 400 including a gas discharge 410 having a lobed fairing 420 according to the above example. The lobed fairing 420 defines three airflow regions downstream of a downstream edge 422. The first region is referred to as a cool region 430, the second region is referred to as a mixed region 432, and the third region is referred to as a hot region 434. The cool region 430 is a region of the duct 400 where only cool air from the duct flowpath upstream of the gas discharge 410 is present. The mixed region 432 is a region where the cool air is mixed with hot air from the gas discharge 410. As the mixed region 432 initially consists of unmixed hot air and cool air at downstream edge 422, there exists a maximum temperature that decreases the farther the air is downstream from the downstream edge 422 and a minimum temperature that increases the farther the air is downstream from downstream edge 422. As the mixed region 432 does not contact the outer diameter wall 402 until a substantial distance downstream of the downstream edge 422, the cool air from the cool air region 430 has had sufficient time to cool the hot air from the gas discharge 410 to below the maximum temperature of the outer diameter wall 402 material. The hot air region 434 is defined along the inner diameter surface 404 and does not extend the full radial height of the duct 400 until after the hot air passes through an exit nozzle 446 of the duct 400. In alternative configurations, where the outer diameter of the duct 400 includes a downstream portion constructed of a material with a high maximum temperature, the hot region 434 may extend the full radial height of the duct 400 after the hot air has traveled sufficiently downstream.

With reference to FIGS. 3 and 5, the width 142, 146 and height 144, 148 dimensions of the peaks 116 and valleys 118 are configured to control the relative sizes and positions of the mixed air region 432 and the hot air region 434. The lobe height 144 determines the size of the mixed region 432 and hot air region 434, with an increased lobe height 144 increasing the size of the mixed region 432 and hot air region 434. Similarly, the valley height 148 determines the positioning of the boundary between the mixed region 432 and the hot region 434. The longer the valley height 148, the closer the valley extends to the inner diameter 404, and the closer the boundary between the mixed region 432 and the hot region 434 is to the inner diameter 404. Further, the ratio of the lobe width 142 to the valley width 146 determines the ratio of hot air to cool air in the mixed region 432, thereby controlling the temperature of the mixed region 432. In alternative examples, where the lobes may not be uniform in shape, the ratio of the cross sectional area of the lobe, normal to flow, to the cross sectional area of the valley 118, normal to flow determines the mix.

Figure 6:
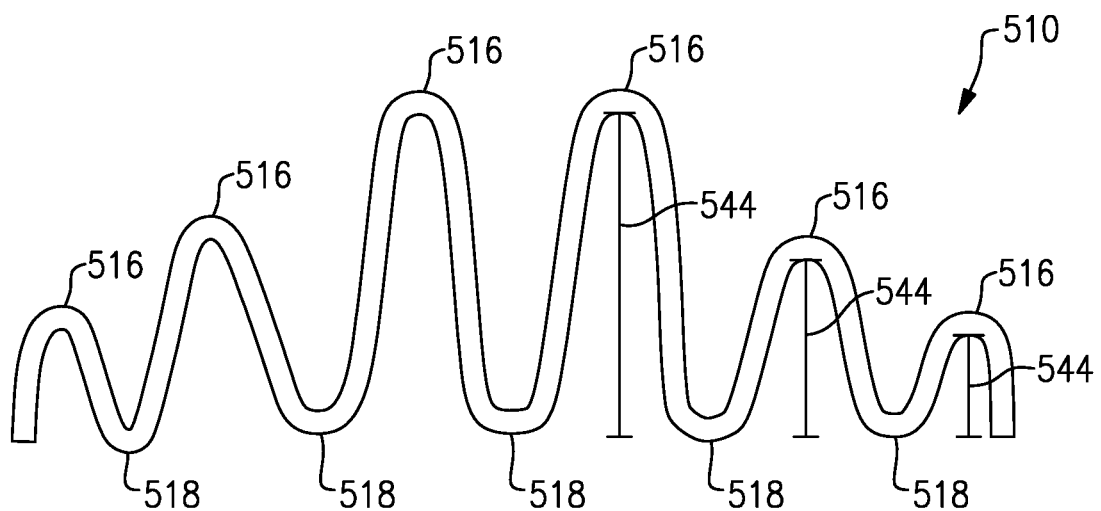
FIG. 6 is a forward view of an alternate gas discharge outlet fairing.

With continued reference to FIG. 3, FIG. 6 schematically illustrates an alternate lobe configuration of a gas discharge outlet 510. As with the example of FIG. 3, the gas discharge outlet 510 includes multiple lobes with a cross sectional area defined by peaks 516 and their adjacent valleys 518. Unlike the example of FIG. 3, however, a peak height 544 decreases towards the outer edges of the gas discharge outlet 110 in a symmetrical manner. The decreasing lobe heights 544 result in a decreasing cross sectional area of each lobe and is utilized to control the radial height of the mixed region at the circumferential edges of the gas discharge outlet 110.

With reference to all of the above described examples, the fairing 112 can be constructed of any material having suitable thermal and shaping properties. By way of example, the fairing 112 could be cast, constructed of pressed sheet metal, milled from a material block, additively manufactured, or constructed using any similar technique.

While described herein as applied to a particular exemplary gas turbine engine, it should be appreciated that the gas discharge fairing configuration can be applied to any gas turbine engine, including a direct drive engine, geared turbofan, and the like, as well as can be applied to non-thrust producing turbines such as land based turbines. Further, the lobed fairing configuration can be adjusted for utilization in an infinite radius duct with minimal changes, and such utilization is within the scope of this disclosure.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
an engine core including a primary flowpath;
a fan forward of the engine core;
a first bypass duct positioned radially outward of the engine core and encompassing every stage of the fan and a second bypass duct disposed between the first bypass duct and the engine core and encompassing at least one stage of the fan and less than every stage of the fan wherein the first bypass duct is defined by an outer diameter wall and an inner diameter wall, and wherein the outer diameter wall is comprised of a first material having a first maximum temperature and the inner diameter wall is comprised of a second material having a second maximum temperature, the second maximum temperature is higher than the first maximum temperature;

a gas discharge protruding radially into the first bypass duct at an axial position of the turbine section, the gas discharge including a fairing defining a lobed outlet; and wherein the lobed outlet includes a plurality of axially aligned peaks and axially aligned valleys, each of the axially aligned valleys being configured to prevent a fluid passing through the valley from traveling radially inward immediately downstream of the fairing and wherein a peak height of the axially aligned peaks decreases towards outer edges of the lobed outlet in a symmetrical manner.

2. The gas turbine engine of claim 1, wherein the gas discharge is connected to a heat exchanger outlet.

3. The gas turbine engine of claim 1, wherein the outer diameter wall further comprises one of the second material and a third material downstream of the first material, the third material having a higher maximum temperature than the first material.

4. The gas turbine engine of claim 3, wherein the third material has a higher maximum temperature than an expected discharge temperature of the lobed outlet.

5. The gas turbine engine of claim 1, wherein the lobed outlet is configured to define a cool air region, a mixed air region and a hot air region within the first bypass duct.

6. The gas turbine engine of claim 5, wherein the hot air region extends along an inner diameter of the first bypass duct.

7. The gas turbine engine of claim 5, wherein the hot air region extends only a partial radial height of the first bypass duct.

8. The gas turbine engine of claim 1, wherein each of the axially aligned valleys defines an axial flowpath immediately downstream of an aft edge of the lobed outlet.

9. The gas turbine engine of claim 1, wherein each of the axially aligned peaks defines a radially inwardly directed flowpath immediately downstream of an aft edge of the lobed outlet.

10. The gas turbine engine of claim 1, wherein the plurality of axially aligned peaks and axially aligned valleys includes at least a first set of peaks having a first height and a second set of peaks having a second height, the first height being different from the second height.

11. The gas turbine engine of claim 1, wherein each of the first bypass duct and the second bypass duct extends a full axial length of the engine core.

12. The gas turbine engine of claim 1, wherein the lobed outlet includes a plurality of peaks and a plurality of valleys and wherein each of the valleys in the plurality of valleys defines a downward sloping region configured to cause airflow within the first bypass duct to flow radially inward as the airflow through the duct approaches the lobed outlet.

13. The gas turbine engine of claim 12, wherein each of the peaks in the plurality of peaks is angled radially inward such that a heated flow exiting the lobed outlet is directed toward an inner diameter wall of the first bypass duct.

14. The gas turbine engine of claim 1, wherein the lobed outlet extends less than a full circumference of the gas turbine engine.

15. The gas turbine engine of claim 1, wherein the lobed outlet defines three airflow regions downstream of a downstream edge, a cool region, a mixed region, and a hot region, wherein the cool region is a region of the first bypass duct where only cool air from the primary flowpath upstream of the gas discharge is present, the mixed region is a region where the cool air is mixed with hot air from the gas discharge, such that there exists a maximum temperature that decreases the farther the air is downstream from the downstream edge and a minimum temperature that increases the farther the air is downstream from the downstream edge.

16. The gas turbine engine of claim 1, wherein the lobed outlet extends less than a full circumference of the first bypass duct.

* * * * *